United States Patent [19]

Shein et al.

[11] 4,320,702
[45] Mar. 23, 1982

[54] STEAM GENERATOR

[75] Inventors: Kyaw J. Shein, Fullerton, Calif.; Raymond J. Neely, Lansdale, Pa.

[73] Assignee: Refreshment Machinery Incorporated, Warminster, Pa.

[21] Appl. No.: 132,204

[22] Filed: Mar. 20, 1980

[51] Int. Cl.³ .............................................. F22B 5/00
[52] U.S. Cl. ................................ 122/13 A; 122/4 A; 219/314; 222/146 HE
[58] Field of Search .................... 122/4 A, 13 A; 222/146 HE; 219/314

[56] References Cited

U.S. PATENT DOCUMENTS

| | | | |
|---|---|---|---|
| 1,258,642 | 3/1918 | Bergeron | 122/4 A |
| 1,650,632 | 11/1927 | Kowallik | 122/4 A |
| 2,804,534 | 8/1957 | Coates | 219/314 |
| 2,961,525 | 11/1960 | Riker | 219/314 |
| 3,730,144 | 5/1973 | Arzberger | 122/13 A |
| 3,782,335 | 1/1974 | Hecktor | 122/13 A |
| 3,787,659 | 1/1974 | Olland | 222/146 HE |
| 3,910,498 | 10/1975 | Harrison | 222/146 HE |

Primary Examiner—Edward G. Favors
Attorney, Agent, or Firm—Seidel, Gonda, Goldhammer & Panitch

[57] ABSTRACT

Steam is generated in a small enclosure disposed within a large tank. Water is separately heated in the enclosure and in the tank. The enclosure is in direct communication with the tank. Steam generated within the enclosure is connected to a dispensing nozzle for use in connection with food and beverage products.

10 Claims, 9 Drawing Figures

STEAM GENERATOR

BACKGROUND OF THE INVENTION

In connection with food and beverage products, such as coffee expresso, and the like there is a need for a dispensing machine for dispensing steam. It is impractical and/or relatively dangerous to have a large tank of water constantly heated to the boiling point so that steam may be available on demand. It is impractical to have a small tank in connection with such a steam generator since it must be constantly refilled. If a large tank is used and the temperature of the water is maintained below the boiling point of water, there will be a time lag necessary to bring the temperature up to the boiling point whereby it is not possible to have steam on demand.

The present invention is directed to a solution to the problem of how to have steam on demand at the most economical and safe arrangement for heating the steam and a solution to the problems attendant thereto.

SUMMARY OF THE INVENTION

The present invention is directed to a low-pressurized steam generator and includes a vessel adapted to contain water. A primary heater is provided for heating the water in the tank to a temperature below the boiling point of water. An upright enclosure is supported in the tank adjacent water line. The capacity of the enclosure is substantially less than the capacity of the tank. An auxiliary heater is mounted in said enclosure. The auxiliary heater operates at a temperature greater than the temperature of the primary heater. The lower end of said enclosure is in open communication with the interior of said tank. A valved conduit means has one end communicating with the upper end of said enclosure. The other end of said valved conduit means is connected to a discharge nozzle. Said conduit is provided with a suction breaker.

It is an object of the present invention to provide a novel and efficient steam generator for providing steam on demand.

It is another object of the present invention to provide a novel low pressure steam generator which is simple, efficient, and reliable.

Other objects and advantages will appear hereinafter.

For the purposes of illustrating the invention, there is shown in the drawings a form which is presently preferred; it being understood, however, that this invention is not limited to the precise arrangements and instrumentalities shown.

DETAILED DESCRIPTION

Figure 1:
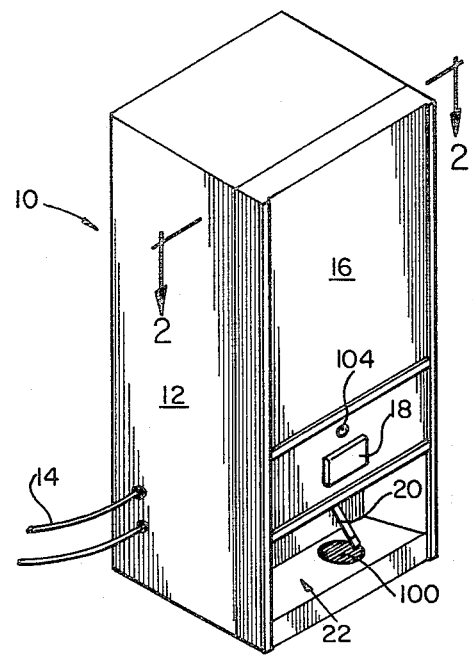
FIG. 1 is the prospective view of a steam generator in accordance with the present invention.

Referring to the drawing in detail, wherein like numerals indicate like elements, there is shown in FIG. 1 a prospective view of a physical embodiment of the steam generator of the present invention and designated generally as 10. In the form illustrated, the steam generator 10 is a counter-type model and includes a housing 12 having a pivotable front wall 16. Electrical and water conduits 14 are connected to components within the housing 12. The front wall 16 has an on-off switch 18 above a well 22. Within the well 22 there is provided a dispensing nozzle 20.

Figure 4:
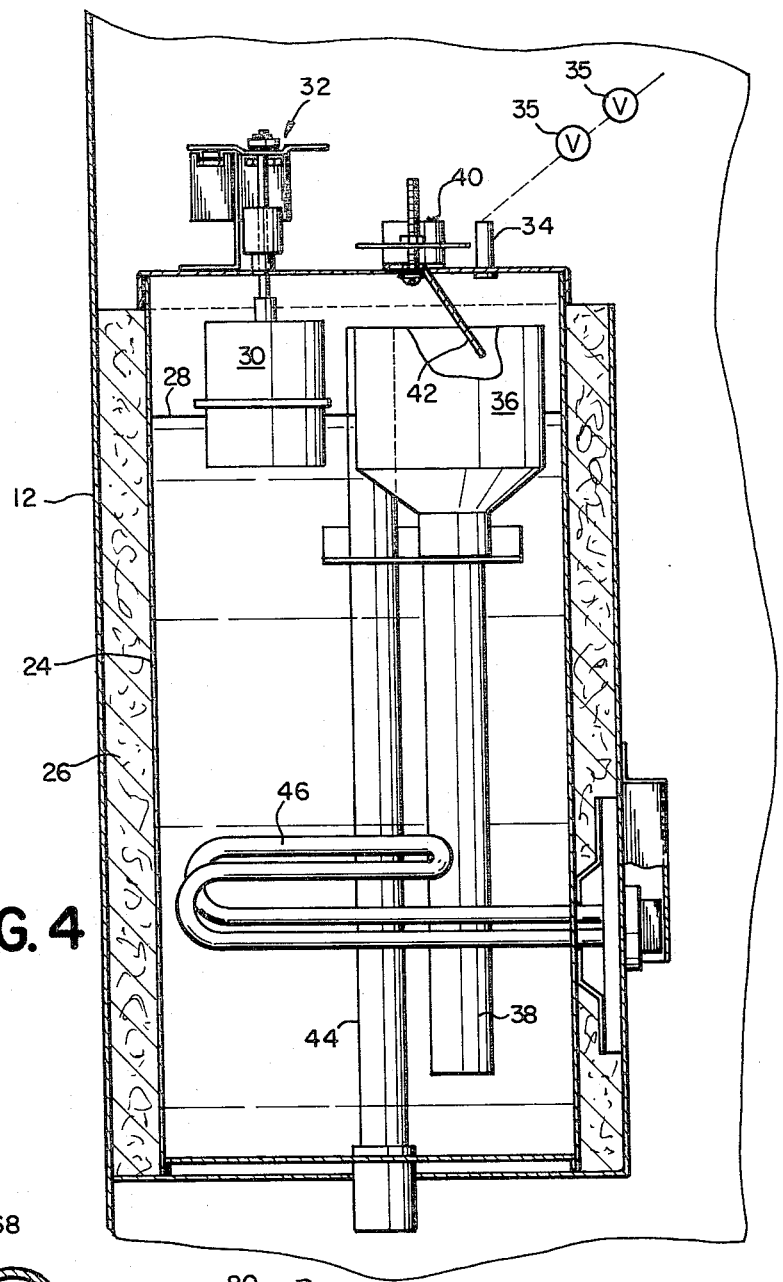
FIG. 4 is a sectional view taken along the line 4—4 in FIG. 2.

Referring to FIG. 4, within the housing 12 there is provided a tank 24 incased within insulation 26. The tank 24 is substantially filled with water and the water level is designated 28. A float 30 is provided in the water and connected to a pair of switches 32 and 33. Switch 32 is located outside the tank 24 and controls coils 37 for a pair of valves 35 in series in the inlet water conduit 34. Switch 33 will be described hereinafter. Conduit 34 extends downwardly through the top wall of the tank 24 in line with the funnel 36 at the end of conduit 38. Conduit 38 extends to a location adjacent the bottom of the tank so that cold water is introduced adjacent the bottom of the tank. Adjacent the funnel 36, there is provided a temperature responsive plate 42 connected to the thermostat 40. The thermostat 40 controls the temperature of the primary heater 46. Heater 46 is designed to heat the water in tank 24 to a non-boiling temperature such as 200-210 degrees F. An overflow conduit 44 defines the upper most limit for the water level 28 and communicates with the exterior of the tank 24 through the bottom wall thereof.

Figure 2:
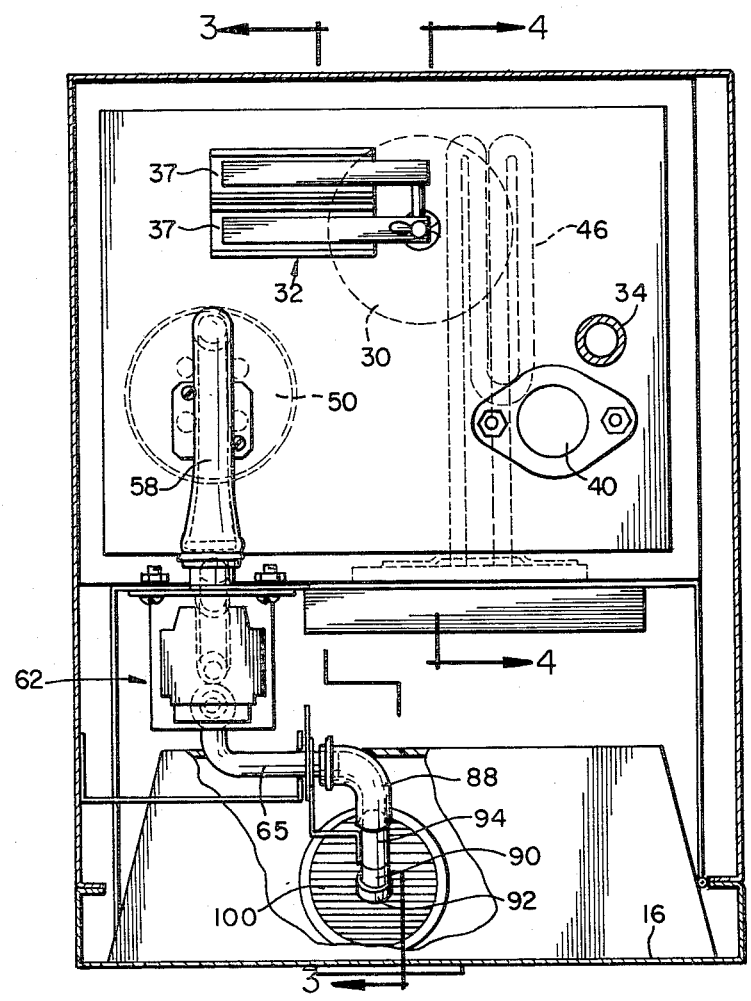
FIG. 2 is a sectional view taken along the line 2—2 in FIG. 1.
Figure 3:
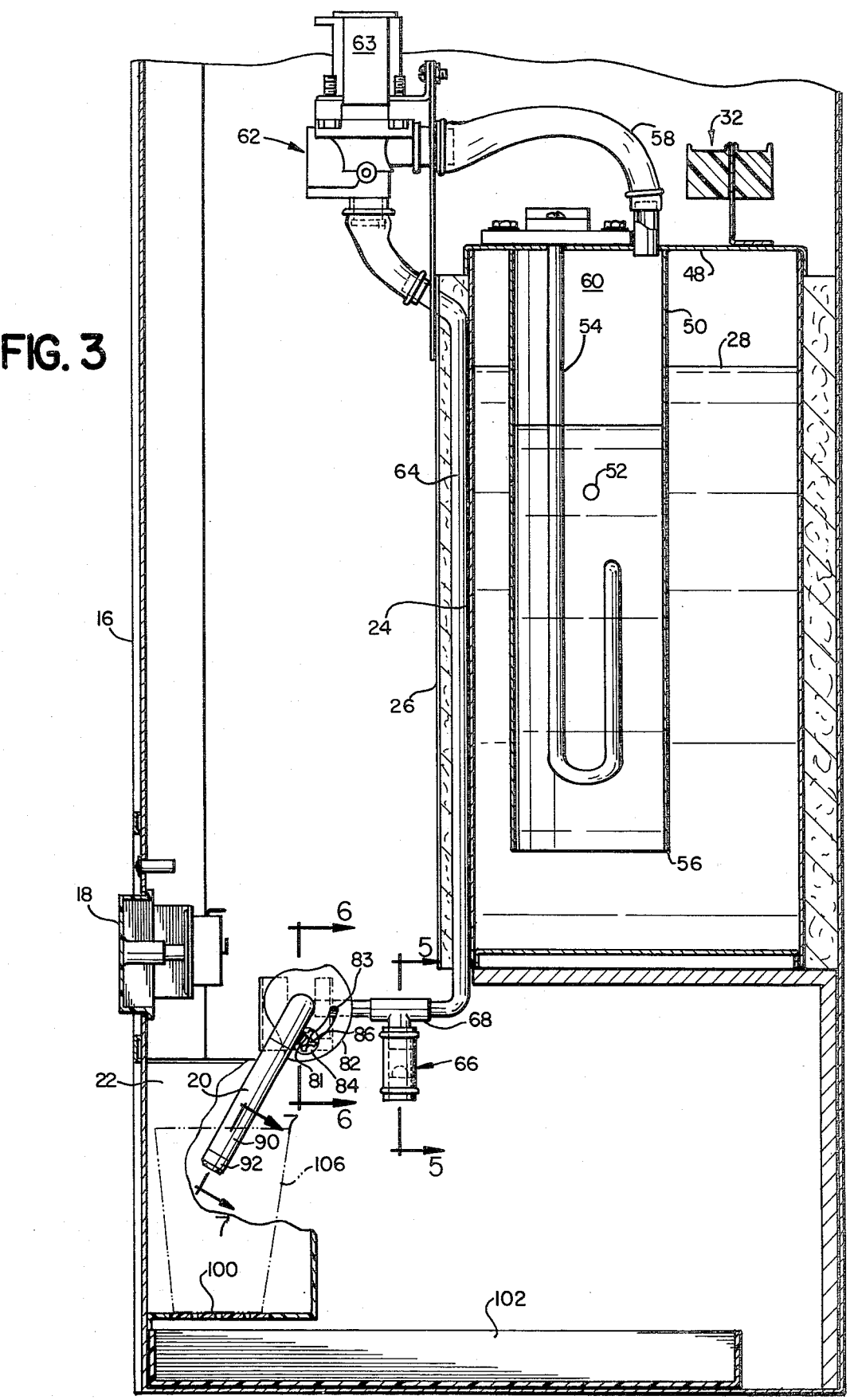
FIG. 3 is a sectional view taking along the line 303 of FIG. 2.

An enclosure 50 is supported by the top wall 48 and-/or is otherwise sealed in connection with the top wall 48. See FIGS. 2 and 3. The capacity of enclosure 50 is substantially less than the capacity of the water in tank 24. Enclosure 50 has holes 52 in the upper portion thereof. The lower end 56 of enclosure 50 is in open direct communication with the water in tank 24. An auxiliary heater 54 is provided within the enclosure 50 for rapidly heating the water therein and generating steam in the chamber 60. The water level within enclosure 50 can never fall below the elevation of the holes 52 since such holes directly communicate the interior of enclosure 50 with the water in tank 24.

A conduit 58 has one end in direct communication with chamber 60. The other end of conduit 58 is connected to a valve 62 which is electrically operated by coil 63. A conduit 64 has one end connected to the valve 62 and extends downwardly along the tank 24 inside the layer of insulation 26. Good thermal contact is provided between the conduit 64 and the tank 24 such as by welding or soldering the same.

Figure 5:
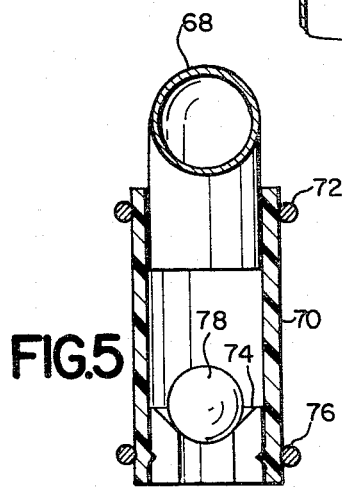
FIG. 5 is a sectional view taken along the line 5—5 in FIG. 3.

Below the elevation of the tank 24, the conduit 64 is connected to one end of a T-junction 68. The vertical leg of T-junction 68 is connected to a suction breaker 66. Suction breaker 66 is preferably as shown in FIG. 5 and includes a tube 70 having its upper end clamped to the T-junction 68 by a fastener 72. A valve seat 74 is secured within the tube 70 and retained therein by a fastener 76. A ball valve member 78 rests on the seat 74. The function of the suction breaker 66 will be described hereinafter.

Figure 6:
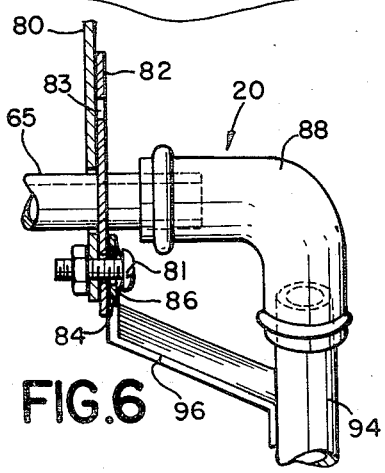
FIG. 6 is a sectional view taken along the line 6—6 in FIG. 3.
Figure 7:
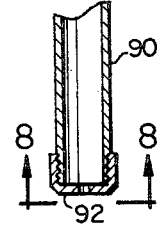
FIG. 7 is a sectional view of the tip end of the nozzle.
Figure 8:
FIG. 8 is an end view taken along the line 8—8 in FIG. 7.
Figure 9:
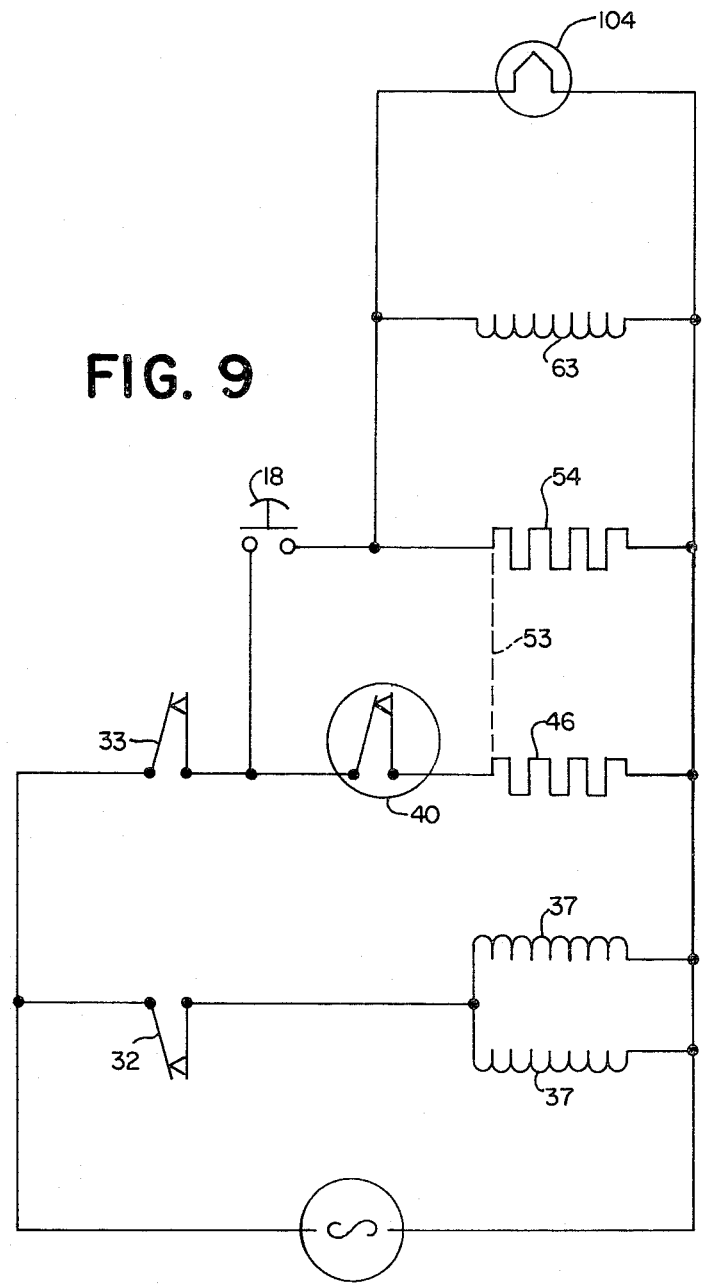
FIG. 9 is an electrical wiring diagram.

The end of the T-junction 68 remote from conduit 64 is connected to one end of conduit 65. The other end of conduit 65 extends through a bracket 80. See FIG 6. A segment 82 has a hole through which the conduit 65 extends. Segment 82 is retained by a friction washer 84 and a spring washer 86. An elbow 88 has one end releasably telescoped over and retained on the adjacent end of conduit 65. The other end of elbow 88 connects with a sleeve 94. Sleeve 94 is removably connected to a nozzle 90 having a replacable tip 92. Sleeve 94 is fixedly connected to the segment 82 by bracket 96. Hence, the nozzle 92 can pivot about the longitudinal axis of conduit 65. The extent of pivotable movement is defined by pin 81 extending through an arcuate slot 83 in the segment 82. The arcuate extent of slot 83 and hence the extent of pivotable movement of the nozzle 90 is preferably at approximately 90 degrees. Within the well 22 there is provided a drain 100 disposed above a drain pan 102. See FIGS. 1-3. Suction breaker 66 is directly above pan 102 so that condensate may discharge in said pan.

PREFERRED METHOD OF OPERATION

The steam generator 10 is preferably constructed as described above so as to facilitate the addition of steam on demand to coffee cream or the like which will then be added to an expresso coffee or cappucino. The steam generator 10 is an open low-pressurized system since the bottom end 56 of tube 50 is in direct communication with the water in tank 24. The auxiliary heater 54 should be of the type which does not burn out or should otherwise be constructed so its hot section starts at an elevation slightly below the elevation of the holes 52 whereby the hot section will constantly be immersed in water.

When the auxiliary heater 54 is turned on, the primary heater 46 is turned off by an electrical interlock 53. If both heaters were on simultaneously, it would draw too many amps for the normal circuit breakers installed in offices and commercial buildings. The conduit 64 is welded, soldered or otherwise arranged in intimate contact with the outer surface tank 24 so as to maintain the temperature of conduit 64 as high as possible. Thus, when steam passes through conduit 64 there is little or no tendency of the steam condensing.

When switch 18 is turned off, coil 63 is de-energized and valve 62 is closed. Some steam will be trapped in conduit 64 and nozzle 20. As such trapped steam cools, it contracts and tends to create a partial vacuum. Suction breaker 66 prevents formation of a partial vacuum in conduit 64. As ball 78 moves upwardly under the suction effect, air enters and balances the steam contraction in conduit 64. The trapped steam eventually condenses and flows into tube 70 where it surrounds ball 78 and accumulates as a column above ball 78. On the next cycle, upward movement of ball 78 due the suction effect will result in discharge of the condensed water into pan 102.

The heaters 46 and 54 are preferably 1000 watt heaters. When auxiliary heater 54 is inoperative, heater 46 is controlled by thermostat 40 so that the temperature of the water in tank 24 is about 200-210 degrees F. If the level of water in tank 24 decreases to a point whereby either heater is in danger of being exposed to air, float 30 trips safety switch 33 which interrupts power to the heaters 46, 54. Switch 33 prevents energization of the heaters during initial installation and when there is an interruption in the water supply.

The system of the present invention is an open system whereby a pressure relief is not needed. The steam pressure obtained results from the differential head of the water level in tank 24 and the water level in enclosure 50. As steam is generated in chamber 60, it depresses the water level in enclosure 50 even though enclosure 60 and tank 24 are in open communication. The head of water in tank 24 above the water level in enclosure 50 is the direct steam pressure in inches of water.

Closing switch 18 causes indicator light 104 to turn on, opens valve 62, and activates heater 54. When valve 62 opens, chamber 60 is exposed to atmospheric pressure and the water levels in tank 24 and enclosure 50 equalize. As steam is generated in chamber 60, it depresses the water level in enclosure 50 and elevates the water level in tank 24.

The nozzle 90 is preferably provided with a variety of tips 92 having a different number and size of holes therein so that different sounds and discharge rates may be attained. The float 30 assures that the water level 28 will be at the desired operating level. Since only the water within enclosure 50 is heated to a boiling temperature, only a small amount of steam need be generated so as to be constantly available on demand with constant replenishment from tank 24 as the water level within enclosure 50 tends to decrease. Since the system is a low-pressurized open system, there is no need for pressure relief valves nor is there any necessity to meet boiler specifications. The only pressures are the back pressure created by the height of the product such as cream in the cup. There is no danger of explosions.

The present invention may be embodied in other specific forms without departing from the spirit or essential attributes thereof and, accordingly, reference should be made to the appended claims, rather than to the foregoing specification, as indicating the scope of the invention.

We claim:

1. A low-pressurized steam generator comprising a tank adapted to contain a supply of water, a primary heater in the tank for heating water, an enclosure in said tank and disposed in an upright position, the capacity of the enclosure being substantially less than the capacity of the tank, the upper end of the enclosure being sealed to a horizontal wall member above water level in the tank, the lower end of said enclosure being in open communication with said tank, an auxiliary heater disposed within said enclosure for converting hot water into steam, a conduit means containing a valve, one end of said conduit means communicating with the upper end of said enclosure above water level therein, a steam discharge nozzle connected to the other end of said conduit means, and a suction breaker connected to said conduit means between the locations of said valve and nozzle.

2. A steam generator in accordance with claim 1 wherein said nozzle is mounted for pivotable movement about a horizontal axis and has a replacable tip.

3. A steam generator in accordance with claim 1 wherein said conduit means has an upright portion in good intimate heat contact with the outer wall of said tank.

4. A steam generator in accordance with claim 1 wherein said enclosure has water inlet holes therethrough in the upper half thereof to facilitate entry of water from the tank.

5. A steam generator in accordance with claim 1 wherein said suction breaker includes a pressure responsive valve for introducing air into said conduit means downstream of said first mentioned valve and for discharge of condensate from said conduit means.

6. A steam generator in accordance with claim 1 including a float in said tank connected to a switch means ouside of said tank for controlling the water level in said tank, an overflow tube for said tank, and an inlet conduit extending through a top wall of said tank.

7. A steam generator in accordance with claim 1 wherein said horizontal wall member is a top wall of said tank, the upper end of said auxiliary heater being supported by said top wall.

8. A steam generator in accordance with claim 1 including a housing surrounding said tank, said housing having a well in the front wall thereof, the discharge end of said nozzle being in said well, and an on-off switch for said valve, said switch being supported by said front wall of said housing above said well.

9. A low-pressurized steam generator comprising an insulated tank adapted to contain a supply of water, a primary heater in the tank for heating water to a temperature below boiling, an enclosure in said tank and disposed in an upright position, the capacity of the enclosure being substantially less than the capacity of the tank, the upper end of the enclosure being sealed to a horizontal wall member above water level in the tank, the lower end of said enclosure being in open communication with said tank, said enclosure having holes therethrough in the upper half thereof below the elevation of the water level in the tank, an auxiliary heater disposed within said enclosure for heating water to its boiling point, a conduit means containing a valve, one end of said conduit means communicating with the upper end of said enclosure above water level therein, a nozzle connected to the other end of said conduit means at an elevation below the elevation of said valve, and means connected to said conduit means for permitting discharge of condensate.

10. A steam generator in accordance with claim 9 including a vacuum breaker having a pressure responsive valve for introducing air into said conduit means downstream of said first mentioned valve.

* * * * *